United States Patent
Osawa

[19]

[11] Patent Number: 6,035,208
[45] Date of Patent: Mar. 7, 2000

[54] CELLULAR TYPE MOBILE COMMUNICATION SYSTEM CAPABLE OF EFFICIENTLY UTILIZING FREQUENCIES

[75] Inventor: Tomoki Osawa, Tokyo, Japan

[73] Assignee: NEC Corporation, Tokyo, Japan

[21] Appl. No.: 08/881,789

[22] Filed: Jun. 24, 1997

[30] Foreign Application Priority Data

Jun. 25, 1996 [JP] Japan ................................. 8-164512

[51] Int. Cl.[7] .............................................. H04Q 7/20
[52] U.S. Cl. ............................ 455/522; 455/62; 455/63; 455/453
[58] Field of Search .......................... 455/62, 449, 450, 455/452, 522, 453, 69, 67.1, 63, 444, 443; 370/329, 331, 332

[56] References Cited

U.S. PATENT DOCUMENTS

| | | | |
|---|---|---|---|
| 5,499,386 | 3/1996 | Karlsson | 455/449 |
| 5,499,395 | 3/1996 | Doi et al. | 455/522 |
| 5,579,373 | 11/1996 | Jang | 455/522 |
| 5,666,654 | 9/1997 | Kanai | 455/450 |
| 5,771,454 | 6/1998 | Ohsawa | 455/452 |
| 5,787,358 | 7/1998 | Takahashi | 455/450 |
| 5,828,948 | 10/1998 | Almgren et al. | 455/450 |
| 5,828,963 | 10/1998 | Grandhi et al. | 455/450 |

FOREIGN PATENT DOCUMENTS 8-140135   5/1996   Japan .

*Primary Examiner*—Dwayne D. Bost
*Assistant Examiner*—Quochien B. Vuong
*Attorney, Agent, or Firm*—Sughrue, Mion, Zinn, Macpeak & Seas, PLLC

[57] ABSTRACT

In a mobile communication system comprising base stations (11, 12) covering microcells (16, 17) and a base station (13) covering a macrocell (18), each of the base stations (11, 12) monitors utilization conditions in speech channels to produce a monitored result indicative of the utilization conditions and controls transmission power on the basis of the monitored result. Responsive to a communication request, each base station (11, 12, 13) selects, as a selected speech channel, one of the speech channels and assigns the selected speech channel when the selected speech channel has a power ratio of a desired wave to an interference wave that is not less than a predetermined level.

32 Claims, 8 Drawing Sheets

CELLULAR TYPE MOBILE COMMUNICATION SYSTEM CAPABLE OF EFFICIENTLY UTILIZING FREQUENCIES

BACKGROUND OF THE INVENTION

This invention relates to a mobile communication system of a cellular type and, in particular, to a mobile communication system having cells hierarchized in accordance with a width of each service area.

In a large-capacity mobile communication system such as an automobile telephone system, effective utilization of frequencies is achieved by covering service areas by a plurality of base stations and by repeatedly using the same speech channel in the base stations where interference does not occur. Such a mobile communication system is called a cellular type mobile communication system.

In recent years, introduction of the cellular type mobile communication system having narrow service areas has been studied in order to increase the number of subscribers which the system can accommodate. Such a narrow service area is called a microcell. Micro-cellulation results in increasing the number of the subscribers but results in increasing expenses of installing the base stations per unit area. As a result, to construct all-of service areas by microcells is not realistic.

As a realistic solution, a hierarchical construction method is studied. In the hierarchical construction method, an area accommodating a lot of subscribers is micro-cellulared into a plurality of microcells and the microcells are covered by a wide service area. Such a wide service area is called a macrocell.

Various channel assignment methods of assigning a speech channel used in each base station are already known. One of the channel assignment methods is called a dynamic channel assignment method which selects, as a selected speech channel, one of the speech channels where interference does not occur in each communication and uses the selected speech channel. The dynamic channel assignment method is disadvantageous in that a control method and structure of apparatus are complicated but is advantageous in that it is possible to accommodate a lot of subscribers. This is because any speech channel is freely used insofar as the interference does not occur. Accordingly, the dynamic channel assignment method has been adopted in the automobile telephone system. In a hierarchical cellular type mobile communication system, use of the dynamic channel assignment method results in increasing the number of the subscribers which the system can accommodate and this method is effective from the viewpoint of effective utilization of frequencies.

The dynamic channel assignment method for use in the hierarchical cellular type mobile communication system is disclosed in Japanese Unexamined Patent Publication of Tokkai No. Hei 8-140,135 or JP-A 8-140,135 which is proposed by the present inventor and which has a title of "MOBILE COMMUNICATION SYSTEM".

Description will be made as regards operation of each base station in the mobile communication system according to JP-A 8-140,135. It is assumed as follows. The speech channels are N channels where N represents an integer which is not less than two. Selection order of speech channels is preliminarily set. In addition, in each cell, a usable speech channel is searched in order of high priority of the speech channels and one of the speech channels is selected as a selected speech channel. In order to avoid interference between hierarchies, the speech channel having a high utilization frequency in the same hierarchy is used in the opposite hierarchy with as low a frequency as possible. For this purpose, the base stations are classified into a plurality of groups of respective hierarchies. In addition, as mentioned above, the channel selection order assigned to each speech channel of each group is determined so as to use the speech channel having the high utilization frequency in the same group with as low a frequency as possible in the opposite group. It is possible. to determine a different channel selection order in each hierarchy. This is because the channel selection order can be preliminarily set prior to installation of the base stations.

To set the channel selection order in the above-mentioned manner results in realizing following characteristics in each hierarchy. A first characteristic is to decrease interference from the opposite hierarchy with the speech channel used in high frequency in the same hierarchy. A second characteristic is that the speech channels having high priority are repeatedly used by mobile stations near to the base station in question more frequently. A third characteristic is that the speech channels having low priority are used by mobile stations apart from the base station in question at a longer repeat interval.

A conventional dynamic channel assignment method applied to the hierarchical cellular type mobile communication system has a good characteristic in a case where the microcells are uniformly spread all over the service areas and/or in another case where speech is uniformly carried out. However, the conventional dynamic channel assignment method is disadvantageous in that speech in the microcell is pressured due to interference in the macrocell on initial introduction of the system where the microcells are not uniformly spread in all over the service areas or when speech is not uniformly carried out.

SUMMARY OF THE INVENTION

It is therefore an object of this invention to provide a mobile communication system which is capable of realizing effective utilization of frequencies.

It is another object of this invention to provide a mobile communication system of the type described, which is capable of carrying out channel assignment effectively in a case where microcells are not uniformly spread all over the service areas.

It is still another object of this invention to provide a mobile communication system of the type described, which is capable of carrying out channel assignment effectively in a case where speech is not uniformly carried out.

Other objects of this invention will become clear as the description proceeds.

On describing the gist of an aspect of this invention, it is possible to understand that a mobile communication system comprises a plurality of base stations each covering a cell. The base stations are classified into first and second groups. Each of the base stations belonging to the first group covers a microcell which is a relatively narrower service area. Each of the base stations belonging to the second group covers a macrocell which is a relatively wider service area so as to cover a plurality of microcells. Responsive to a communication request, each base station selects, as a selected speech channel, one of a plurality of speech channels and assigns the selected speech channel when the selected speech channel has a power ratio of a desired wave to an interference wave that is not less than a predetermined level.

According to a further aspect of this invention, in the above-understood mobile communication system, each of the base stations belonging to the first group comprises monitor means for monitoring utilization conditions in the speech channels to produce a monitored result indicative of the utilization conditions, and transmission power control means for controlling transmission power on the basis of the monitored result.

On describing the gist of another aspect of this invention, it is possible to understand that a mobile communication system comprises a plurality of base stations each covering a cell. The base stations are classified into first and second groups. Each of the base stations belonging to the first group covers a microcell which is a narrow service area. Each of the base stations belonging to the second group covers a macrocell which is a wide service area so as to cover a plurality of microcells. The base stations belonging to the first group are assigned with a selection order of a plurality of speech channels that is different from that of the base stations belonging to the second group. Responsive to a communication request, each base station selects, as a selected speech channel, one of the speech channels in accordance with the selection order and assigns the selected speech channel when the selected speech channel has a power ratio of a desired wave to an interference wave that is not less than a predetermined level.

According to a further aspect of this invention, in the afore-understood mobile communication system, each of the base stations belonging to the first group comprises monitor means for monitoring utilization conditions in the speech channels to produce a monitored result indicative of the utilization conditions, and transmission power control means for controlling transmission power on the basis of the monitored result.

DESCRIPTION OF THE PREFERRED EMBODIMENTS

Figure 1:
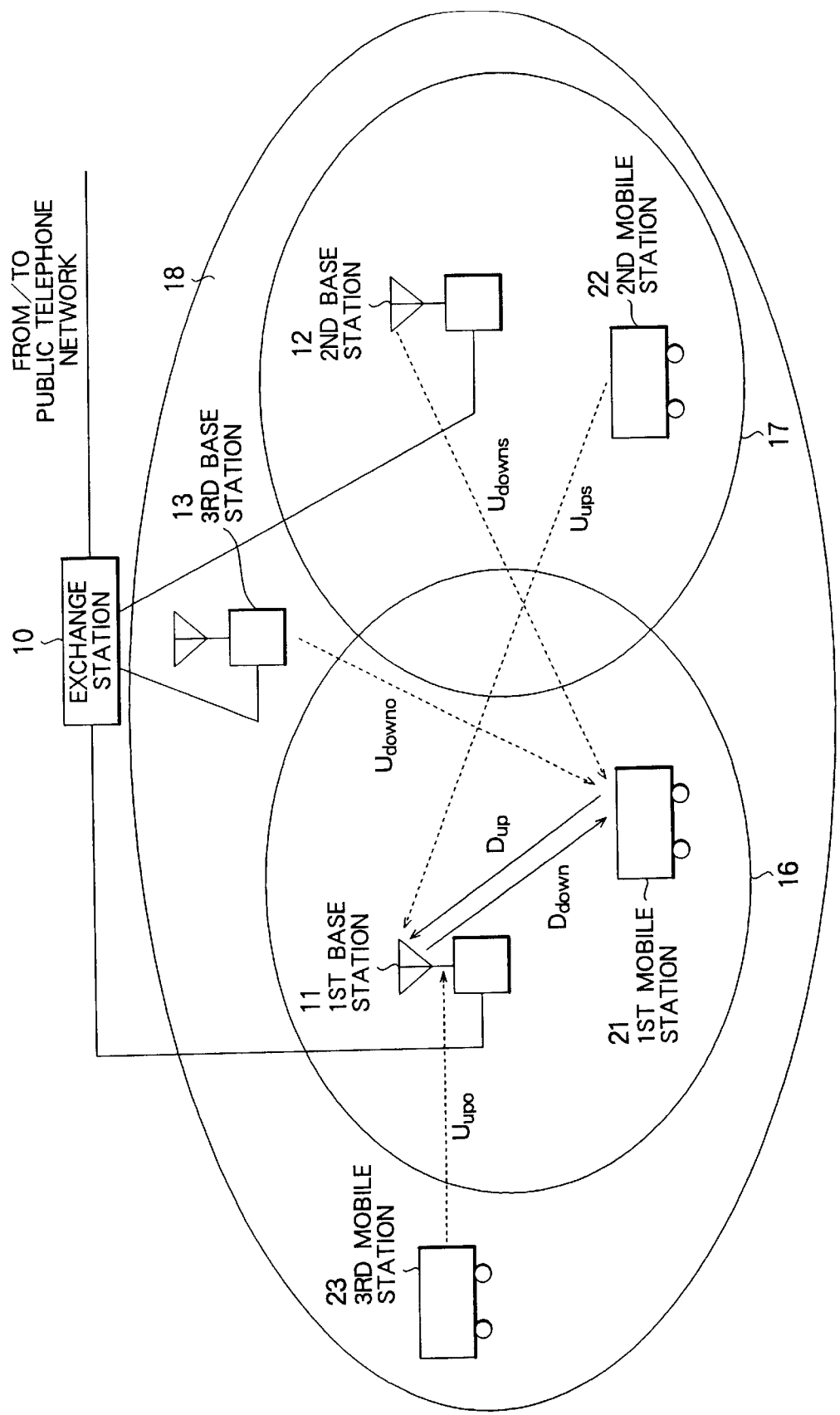
FIG. 1 is a block diagram of a mobile communication system having hierarchized service areas to which this invention is applicable.

Referring to FIG. 1, description will proceed to a cellular type mobile communication system to which the present invention is applicable. The illustrated cellular type mobile communication system has a plurality of cells which are two-hierarchized into microcells and one or more macrocells. A channel assignment method is applied to the cellular type mobile communication system.

The illustrated cellular type mobile communication system comprises an exchange station 10 and first through third base stations 11, 12, and 13 which are connected to the exchange station 10. The exchange station 10 is connected to a public telephone network (not shown). The first base station 11 covers a first microcell 16. The second base station 12 covers a second microcell 17. The third base station 13 covers a macrocell 18. The macrocell 18 overspreads the first and the second microcells 16 and 17. In other words, the first and the second base stations 11 and 12 are installed in the first and the second microcells 16 and 17 while the third base station 13 is installed in the macrocell 18.

The first through the third base stations 11 to 13 are classified into a first group and a second group. The first group is a set of base stations each covering the microcell which is a relatively narrower service area. The second group is a set of base stations each covering the macrocell which is a relatively wider service area. In the example being illustrated, the first and the second base stations 11 and 12 belong to the first group while the third base station 13 belongs to the second group.

In addition, in the example being illustrated, a first mobile station 21 lies in the first microcell 16, a second mobile station 22 lies in the second microcell 17, and a third mobile station 23 lies in the macrocell 18.

In FIG. 1, reference symbols $D_{up}$, $U_{ups}$ and $U_{upo}$ represent an upward desired wave level in the first base station 11, an upward same interference level from the same hierarchy in the first base station 11, and an upward opposite interference level from the opposite hierarchy in the first base station 11, respectively. In addition, reference symbols $D_{down}$, $U_{downs}$, and $U_{downo}$ represent a downward desired wave level in the first mobile station 21, a downward same interference level from the same hierarchy in the first mobile station 21, and a downward opposite interference level from the opposite hierarchy in the first mobile station 21, respectively.

It will be assumed that a communication request occurs in the first mobile station 21 lying in the first microcell 16 covered with the first base station 11. In this event, selection and utilization are made as regards a speech channel where an upward power ratio ($D_{up}$–$U_{ups}$–$U_{upo}$) of the upward desired wave to the upward interference in the first base station 11 and a downward power ratio ($D_{down}$–$U_{downs}$–$U_{downo}$) of the downward desired wave to the downward interference are not less than a predetermined value.

Figure 2:
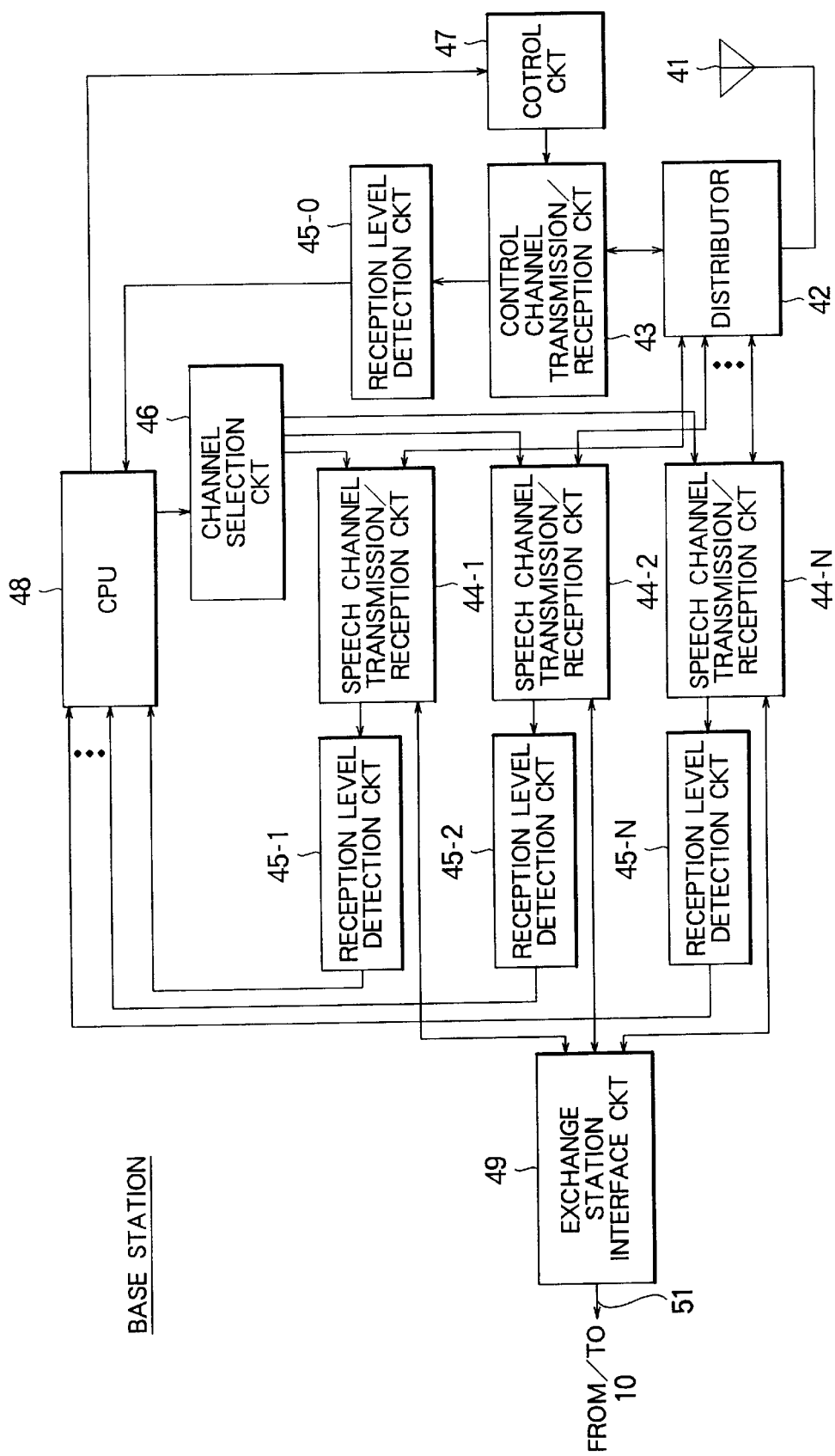
FIG. 2 is a block diagram of a base station for use in the mobile communication system illustrated in FIG. 1.

Turning to FIG. 2, description will proceed to the base station. The base station comprises a base antenna 41 for carrying out transmission and reception of electromagnetic waves on a frequency band. As is well known in the art, the frequency band is divided into a control channel and a plurality of speech channels. The control channel is for transmitting a control signal while the speech channels are for transmitting speech signals. The base antenna 41 is connected to a base distributor 42 which separates the received electro-magnetic waves into a received control signal and received speech signals and multiplexes a transmission control signal and transmission speech signals into the electromagnetic waves to be transmitted. The base distributor 42 is connected to a base control channel transmission/reception circuit 43 and first through N-th base speech channel transmission/reception circuits 44-1, 44-2, . . . , and 44-N, where N represents a positive integer which is not less than two. The base control channel transmission/reception circuit 43 carries out transmission and reception of the control signal on the control channel. The first through the N-th base speech channel transmission/reception circuits 44-1 to 44-N carry out transmission and reception of the speech signals on the speech channels.

The base control channel transmission/reception circuit 43 is connected to a base control channel reception level detection circuit 45-0 while the first through the N-th base speech channel transmission/reception circuits 44-1 to 44-N are connected to first through N-th base speech channel reception level detection circuits 45-1, 45-2, . . . , and 45-N, respectively. The base control channel reception level detection circuit 45-0 and the first through the N-th base speech channel reception level detection circuits 45-0 to 45-N detect or measure reception levels of the received electromagnetic waves.

In addition, the first through the N-th base speech channel transmission/reception circuits 44-1 to 44-N are connected to a base channel selection circuit 46 in common. The base channel selection circuit 46 carries out selection of the speech channels to be transmitted and received. The base control channel transmission/reception circuit 43 is connected to a base control circuit 47. The base control circuit 47 carries out instructions for transmission/reception of various commands on the control channel and for measurement of the reception level.

The base station further comprises a base central processing unit (CPU) 48 which plays a central role in control of the base station. The base central processing unit 48 is connected to the base control channel reception level detection circuits 45-0, the first through the N-th base speech channel reception level detection circuits 45-1 to 45-N, the base channel selection circuit 46, and the base control circuit 47 via input/output ports thereof. The base central processing unit 48 includes a base read-only memory (ROM) (not shown) for storing a program and a channel selection order and a base random access memory (RAM) (not shown) for temporarily storing data which are necessary to make the program run.

The first through the N-th base speech channel transmission/reception circuits 44-1 to 44-N are connected to an exchange station interface circuit 49 in common. The exchange station interface circuit 49 is connected to the exchange station 10 (FIG. 1) through a communication cable 51 on which time division multiplexed data are transmitted and received between the exchange station 10 and the base station.

Figure 3:
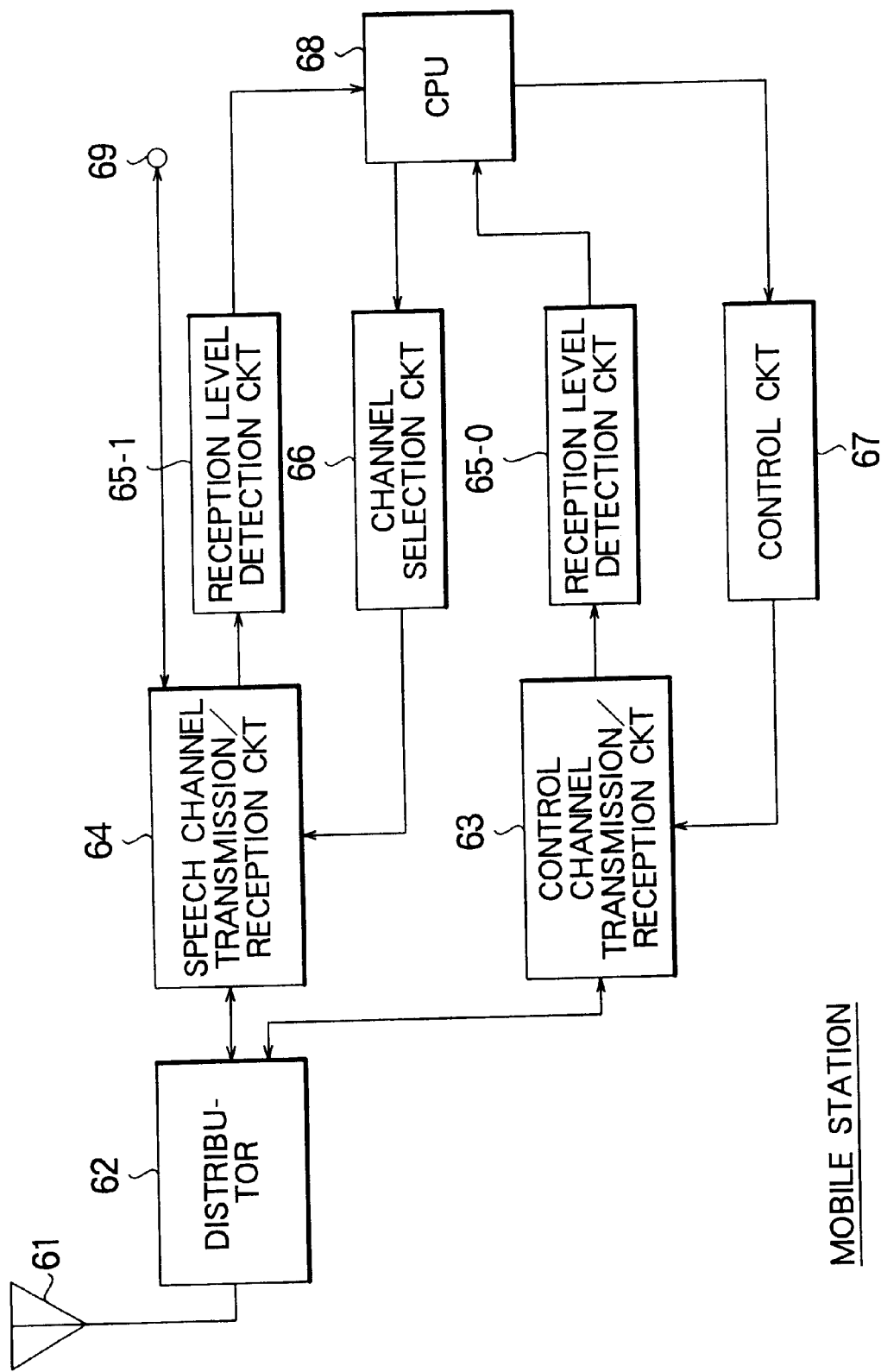
FIG. 3 is a block diagram of a mobile station for use in the mobile communication system illustrated in FIG. 1.

Turning to FIG. 3, description will proceed to the mobile station. The mobile station comprises a mobile antenna 61 for carrying out transmission and reception of electromagnetic waves to and from the base station. The mobile antenna 61 is connected to a mobile distributor 62 which separates the received electromagnetic wave into a received control signal and a received speech signal and multiplexes a transmission control signal and a transmission speech signal into the electromagnetic wave to be transmitted. The mobile distributor 62 is connected to a mobile control channel transmission/reception circuit 63 and a mobile speech channel transmission/reception circuit 64. The mobile control channel transmission/reception circuit 63 carries out transmission and reception of the control signal on the control channel. The mobile speech channel transmission/reception circuit 64 carries out transmission and reception of the speech signal on the speech channel.

The mobile control channel transmission/reception circuit 63 is connected to a mobile control channel reception level detection circuit 65-0 while the mobile speech channel transmission/reception circuits 64 is connected to a mobile speech channel reception level detection circuit 65-1. The reception level detection circuits 65-0 and 65-1 detect or measure reception levels of the received electromagnetic wave.

In addition, the mobile speech channel transmission/reception circuits 64 is connected to a mobile channel selection circuit 66 for carrying out selection of a speech channel to transmitted and be received. The mobile control channel transmission/reception circuit 63 is connected to a mobile control circuit 67. The mobile control circuit 67 carries out instructions for measurement of the reception level on the control channel and for transmission of a measured result of the reception level on the speech channel via the control channel.

The mobile station further comprises a mobile central processing unit (CPU) 68 which plays a central role in control of the mobile station. The mobile central processing unit 68 is connected to the mobile control channel reception level detection circuit 65-0, the mobile speech channel reception level detection circuit 65-1, the mobile channel selection circuit 66, and the mobile control circuit 67 via input/output ports thereof. The mobile central processing unit 68 includes a mobile read-only memory (ROM) (not shown) and a mobile random access memory (RAM) (not shown) in the similar manner to the base central processing unit 58 of the base station. The mobile read-only memory preliminarily stores a channel selection order of a group on transmission of the communication request.

The mobile speech channel transmission/reception circuit 64 is connected to an external device (not shown) via a data input/output terminal 69. The mobile speech channel transmission/reception circuit 64 transmits and receives data to and from the external device via the data input/output terminal 69. The external device may be a modem, a microphone and a speaker which are connected to the data input/output terminal 69 via an input/output amplifier.

Figure 4:
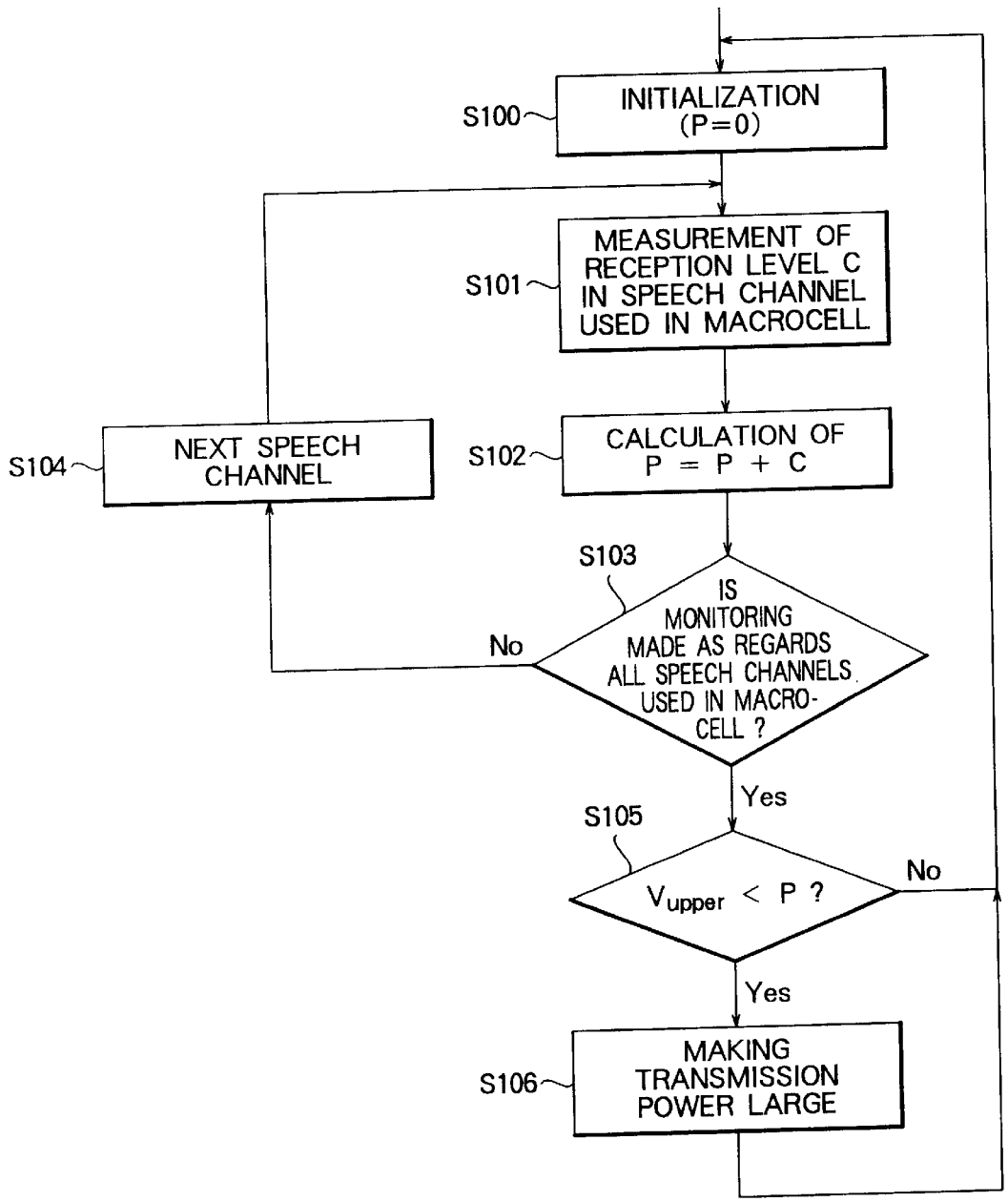
FIG. 4 shows a flow chart for use in describing a transmission power control method in a base station belonging to a first group of the mobile communication system illustrated in FIG. 1.

Referring to FIG. 4 in addition to FIGS. 1 and 2, description will be made as regards a transmission power control in the base station belonging to the first group of the cellular type mobile communication system illustrated in FIG. 1. Each of the first and the second base stations 11 and 12 covering the first and the second microcells 16 and 17 repeatedly carries out processing illustrated in FIG. 4 concurrently with the above-mentioned processing. In the example being illustrated, each of the first and the second base stations 11 and 12 uses reception strength of electric field of each speech channel to measure the utilization frequency in all speech channels.

After the base central processing unit 48 of the base station carries out initialization (P=0) at a step S100, the base central processing unit 48 successively receives, from the base speech channel reception level detection circuits 45-1 to 45-N, measured results each of which indicates a reception level C of electric field in a speech channel which is used in the macrocell at a step S101 and then the base central processing unit 48 accumulates measured results at a step S102. The step S102 proceeds to a step S103 at which the base central processing unit 48 determines whether or not monitoring is made as regards all speech channels used in the macrocell. When a determination in the step S103 is negative, the step S103 is followed by a step S104 at which the base central processing unit 48 makes the base channel selection circuit 46 select the next speech channel used in the macrocell. The base central processing unit 48 turns back from the step S104 to the step S101. At any rate, the base central processing unit 48 at the steps S100 to S104 serves, in cooperation with the base speech channel reception level detection circuits 45-1 to 45-N and the base channel selection circuit 46, as a monitor arrangement for monitoring utilization conditions in the speech channels to produce a monitored result P indicative of the utilization conditions. The monitor arrangement may monitor only the speech channels each having high priority in the second group.

When the monitoring is made as regards all speech channels used in the macrocell (Yes in the step S103), the step S103 is succeeded by a step S105 at which the base central processing unit 48 determines whether or not the monitored result P is larger than an upper limit threshold value $V_{upper}$. The monitored result P represents a sum of signal levels in all speech channels assigned to the macrocell and corresponds to the number of speech channels which the base stations belonging to the second group use. If the monitored result P is not more than the upper limit threshold value $V_{upper}$ (No in the step S105), namely, $$V_{upper} > P,$$

the base central processing unit 48 turns back from the step S105 to the step S100 immediately.

If the monitor result P is larger than the threshold value $V_{upper}$, namely, $$V_{upper} < P,$$

the base central processing unit 48 predicts that the microcell suffers strong interference from the macrocell because a lot of speech channels are used in the macrocell and the base central processing unit 48 therefore makes transmission power in the base station in question large at a step S106. The base central processing unit 48 turns back from the step S106 to the step S100. Accordingly, the third base station 13 covering the macrocell 18 recognizes more speech channels used in the first and the second microcells 16 and 17. As a result, the third base station 13 belonging to the second group does not use the last-mentioned speech channels and it is possible to decrease mutual interference between the hierarchies. At any rate, the base central processing unit 48 at the steps S105 and S106 acts as a transmission power control arrangement for controlling the transmission power on the basis of the monitored result. The illustrated transmission power control arrangement makes the transmission power large when the monitored result P indicates that the base station 13 belonging to the second group uses a lot of speech channels which are in number more than a first predetermined number.

Figure 5:
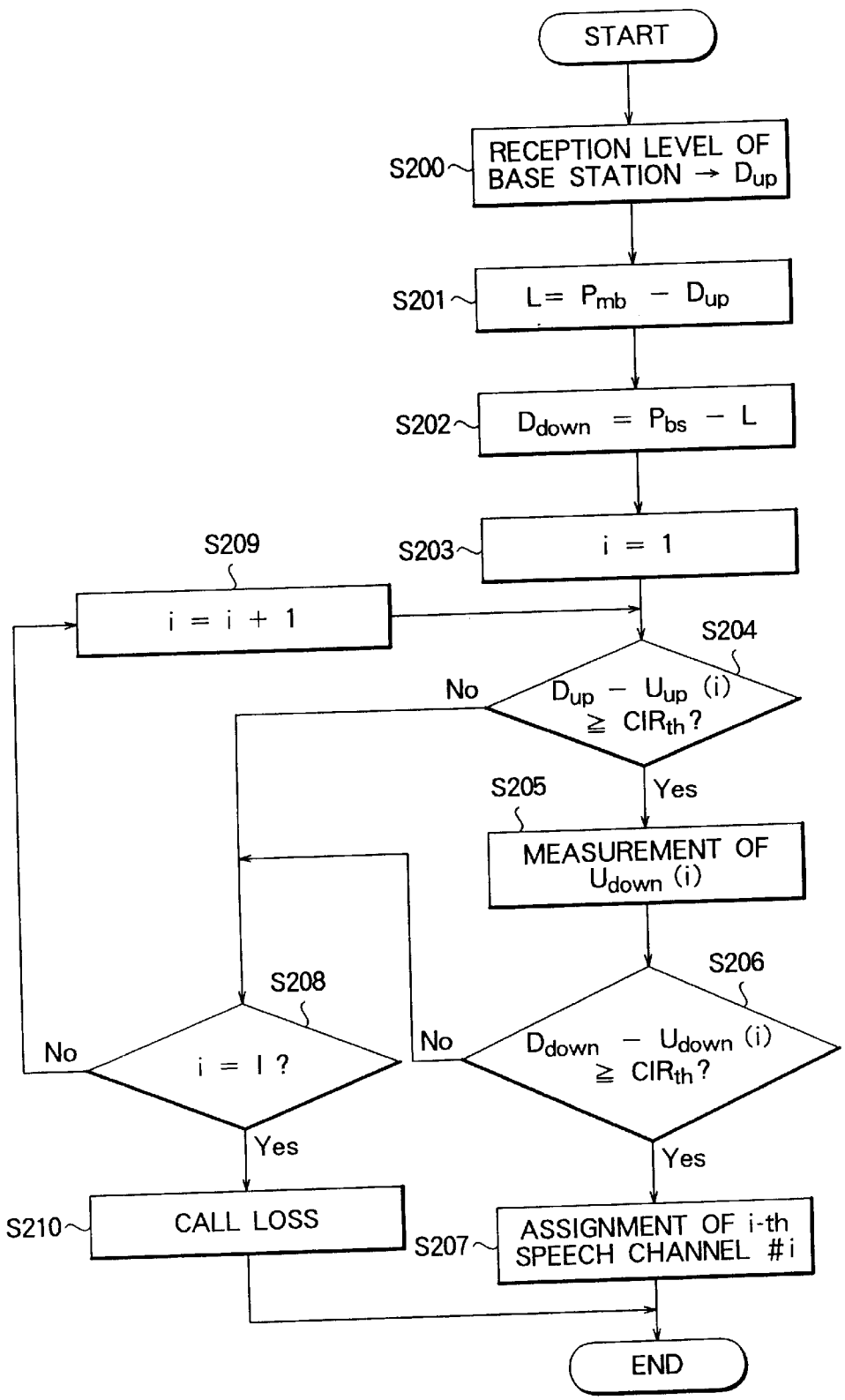
FIG. 5 shows a flow chart for use in describing a channel assignment method in a base station belonging to a first group of the mobile communication system illustrated in FIG. 1.
Figure 6:
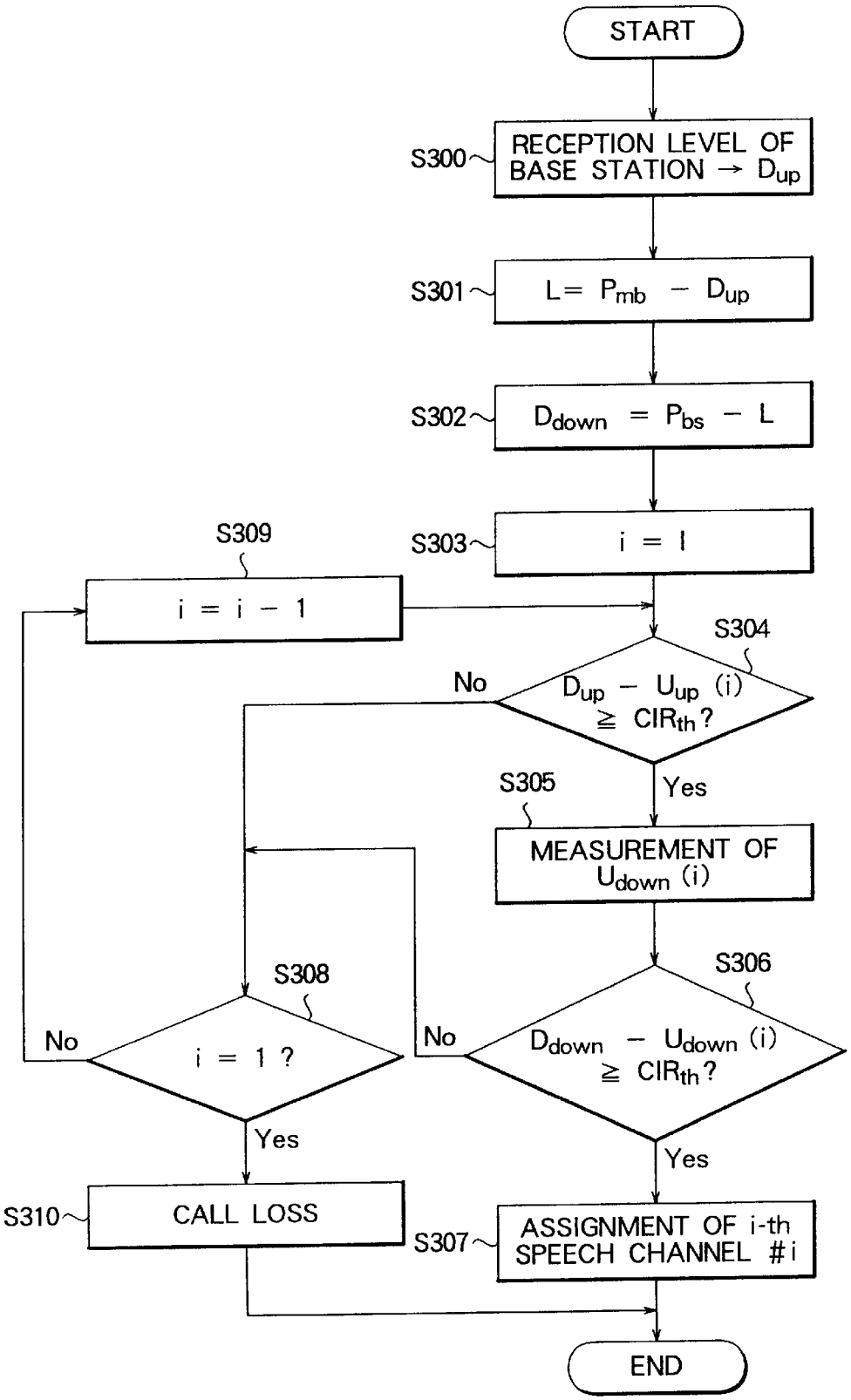
FIG. 6 shows a flow chart for use in describing a channel assignment method in a base station belonging to a second group of the mobile communication system illustrated in FIG. 1.

Referring to FIGS. 5 and 6, description will be made as regards a channel assignment method in the base stations. Channel selection order of the speech channels in each group (hierarchy) is determined so that the speech channels having high priority are repeatedly used by the mobile stations near to the base station with considerable frequency and that the speech channels used in the same hierarchy with the considerable frequency are not used in the opposite hierarchy. By way of example, in a case where there is two hierarchies, each base station belonging to a first hierarchy (or the microcell) selects the speech channels in the order of ascending channel numbers (which are hereinunder represented by #i:i=1, 2, 3, . . . , and so on) assigned to the speech channels while each base station belonging to a second hierarchy (or the macrocell) selects the speech channels in the order of descending channel numbers.

FIG. 5 shows a flow chart for describing control in the base station belonging to the first or microcell hierarchy (the first group). FIG. 6 shows another flow chart for describing control in the base station belonging to the second or macrocell hierarchy (the second group). It will be presumed as follows. The base central processing unit 48 of each base station periodically receives a value $(U_{ups}(i)+U_{upo}(i))$ of an interference level of free or blank speech channels and stores it. In addition, transmission power $P_{ms}$ of the mobile station and transmission power $P_{bs}$ of the base station are known.

Referring first to FIG. 5, description will proceed to control operation of the base station belonging to the microcell hierarchy. While the description will proceed to control operation of the first base station 11 as the base station belonging to the microcell hierarchy, control operation of the second base station 12 is similar to that of the first base station 11.

When a communication request occurs or when a call request received in the base control channel transmission/reception circuit 43 of the first base station 11 occurs, the base central processing unit 48 of the first base station 11 stores a reception level from the base control channel reception level detection circuit 45-0 as an upward desired wave level $D_{up}$ at a step 6200. The reception level is a reception level of a call request signal received on the control channel in a case of an outgoing call from the first mobile station 21. On the other hand, the reception level is a reception level of a call answering signal received on the control channel in another case of an incoming call to the first mobile station 21. The step S200 is followed by a step S201 at which the base central processing unit 48 of the first base station 11 subtracts the upward desired wave level $D_{up}$ from the transmission power $P_{ms}$ of the mobile station to obtain a difference $(P_{ms}-D_{up})$ as a propagation loss L between the first base station 11 and the first mobile station 21. Inasmuch as there is reversibility between an upward communication line (or an up link) and a downward communication line (or a down link), it is presumed that the propagation loss L on the upward communication line is equal to propagation loss L on the downward communication line. As a result, the base central processing unit 48 of the first base station 11 calculates a downward desired wave level $D_{down}$ in the first mobile station 21 by subtracting the propagation loss L from the transmission power $P_{bs}$ of the base station at a step S202. The step S202 proceeds to a step S203 at which the base central processing unit 48 of the first base station 11 sets one as a parameter i for identifying an i-th speech channel having the channel number of #i, where the parameter i is a variable between one and I, both inclusive, where I represents a positive integer which is not less than two.

The step S203 is succeeded by a step S204 at which the base central processing unit 48 of the first base station 11 compares a predetermined value $CIR_{th}$ with an i-th upward power ratio $(D_{up}-U_{up}(i))$ of the desired wave to the interference wave that is obtained by subtracting an i-th upward interference level $U_{up}(i)$ of the i-th speech channel #i from the upward desired wave level $D_{up}$. The i-th upward interference level $U_{up}(i)$ of the i-th speech channel #1 is equal to a sum of an i-th upward same interference level $U_{ups}(i)$ from the same hierarchy on the i-th speech channel #i and an i-th upward opposite interference level $U_{upo}(i)$ from the opposite hierarchy on the i-th speech channel #i. That is:

$$U_{up}(i)=U_{ups}(i)+U_{upo}(i).$$

When the predetermined value $CIR_{th}$ is not more than the i-th upward power ratio $(D_{up}-U_{up}(i))$ of the desired wave to the interference wave in the i-th speech channel #i (Yes in the step S204), the step S204 is followed by a step S205 at which the base central processing unit 48 of the first base station 11 instructs the first mobile station 21 to measure an i-th downward interference wave level $U_{down}(i)$ of the i-th speech channel #i and receives its measured result or the i-th downward interference wave level $U_{down}(i)$ from the first mobile station 21. The i-th downward interference wave level $U_{down}(i)$ of the first speech channel #1 is equal to a sum of an i-th downward same interference level $U_{downs}(i)$ from the same hierarchy on the i-th speech channel #i and an i-th downward opposite interference level $U_{downo}(i)$ from the opposite hierarchy on the i-th speech channel #i. That is:

$$U_{down}(i) = U_{downs}(i) + U_{downo}(i).$$

The step S205 proceeds to a step S206 at which the base central processing unit 48 of the first base station 11 compares the predetermined value $CIR_{th}$ with an i-th downward power ratio $(D_{down} - U_{down}(i))$ of the desired wave to the interference wave that is obtained by subtracting the i-th downward interference level $U_{down}(i)$ of the i-th speech channel #i from the downward desired wave level $D_{down}$. If the predetermined value $CIR_{th}$ is not more than the i-th downward power ratio $(D_{down} - U_{down}(i))$ of the desired wave to the interference wave in the i-th speech channel #i (Yes in the step S206), the step S206 is followed by a step S207 at which the base central processing unit 48 of the first base station 11 assigns, as a selected speech channel, the i-th speech channel #i for the communication request.

When the i-th upward power ratio $(D_{up} - U_{up}(i))$ of the desired wave to the interference wave in the i-th speech channel #i is less than the predetermined value $CIR_{th}$ (No in the step S204), the step S204 is followed by a step S208. In addition, when the i-th downward power ratio $(D_{down} - U_{down}(i))$ of the desired wave to the interference wave in the i-th speech channel #i is less than the predetermined value $CIR_{th}$ (No in the step S206), the step S206 is also followed by the step S208. Inasmuch as the base central processing unit 48 of the first base station 11 does not carry out judgment for all speech channels at this time instant (No in the step S208), the step S208 is succeeded by a step S209 at which the base central processing unit 48 of the first base station 11 increments the parameter i by one to select an (i+1)-th speech channel having the channel number of #(i+1). The base central processing unit 48 of the first base station 11 turns back from the step S209 to the step S204. In the similar manner as described above, judgment of interference conditions is carried out by repeating the steps S204 to S206. Although the base central processing unit 48 of the first base station 11 carries out judgment for an I-th speech channel #I which is a final speech channel, when the base central processing unit 48 of the first base station 11 cannot find a usable speech channel (Yes of the step S208), the step S208 is succeeded by a step S210 at which call loss occurs in the base central processing unit 48 of the first base station 11.

Turning to FIG. 6, description will proceed to control operation of the base station (the third base station 13) belonging to the macrocell hierarchy (the second group). The control operation of the third base station 13 is similar to that of the first base station 11 (FIG. 5) except that control of the parameter i is different from each other in the manner which will later be described.

When a communication request occurs or when a call request received in the base control channel transmission/reception circuit 43 of the third base station 13 occurs, the base central processing unit 48 of the third base station 13 stores a reception level from the base control channel reception level detection circuit 45-0 as an upward desired wave level $D_{up}$ at a step S300. The reception level is a reception level of a call request signal received on the control channel in a case of an outgoing call from the third mobile station 23. On the other hand, the reception level is a reception level of a call answering signal received on the control channel in another case of an incoming call to the third mobile station 23. The step S300 is followed by a step S301 at which the base central processing unit 48 of the third base station 13 subtracts the upward desired wave level $D_{up}$ from the mobile transmission power $P_{ms}$ of the third mobile station 23 to obtain a difference $(P_{ms} - D_{up})$ as a propagation loss L between the third base station 13 and the third mobile station 23. The step S301 is succeeded by a step S302 at which the base central processing unit 48 of the third base station 13 calculates a downward desired wave level $D_{down}$ in the third mobile station 23 by subtracting the propagation loss L from the base transmission power $P_{bs}$ of the third base station 13. The step S302 proceeds to a step S303 at which the base central processing unit 48 of the third base station 13 sets the positive integer I as the parameter i. That is, as contrast with channel selection order in the microcell, the base central processing unit 48 of the third base station 13 sets the parameter I which corresponds to the I-th speech channel.

The step S303 is succeeded by a step S304 at which the base central processing unit 48 of the third base station 13 compares the predetermined value $CIR_{th}$ with the i-th upward power ratio $(D_{up} - U_{up}(i))$ of the desired wave to the interference wave that is obtained by subtracting the i-th upward interference level $U_{up}(i)$ of the i-th speech channel #i from the upward desired wave level $D_{up}$. When the predetermined value $CIR_{th}$ is not more than the i-th upward power ratio $(D_{up} - U_{up}(i))$ of the desired wave to the interference wave in the i-th speech channel #i (Yes in the step S304), the step S304 is followed by a step S305 at which the base central processing unit 48 of the third base station 13 instructs the third mobile station 23 to measure the i-th downward interference wave level $U_{down}(i)$ of the i-th speech channel #i and receives its measured result or the i-th downward interference wave level $U_{down}(i)$ from the third mobile station 23.

The step S305 proceeds to a step S306 at which the base central processing unit 48 of the third base station 13 compares the predetermined value $CIR_{th}$ with the i-th downward power ratio $(D_{down} - U_{down}(i))$ of the desired wave to the interference wave that is obtained by subtracting the i-th downward interference level $U_{down}(i)$ of the i-th speech channel #i from the downward desired wave level $D_{down}$. If the predetermined value $CIR_{th}$ is not more than the i-th downward power ratio $(D_{down} - U_{down}(i))$ of the desired wave to the interference wave in the i-th speech channel #i (Yes in the step S306), the step S306 is followed by a step S307 at which the base central processing unit 48 of the third base station 13 assigns the i-th speech channel #i as the selected speech channel for the communication request.

When the i-th upward power ratio $(D_{up} - U_{up}(i))$ of the desired wave to the interference wave in the i-th speech channel #i is less than the predetermined value $CIR_{th}$ (No in the step S304), the step S304 is followed by a step S308. In addition, when the i-th downward power ratio $D_{down} - U_{down}(i)$ of the desired wave to the interference wave in the i-th speech channel #i is less than the predetermined value $CIR_{th}$ (No in the step S306), the step S306 is also followed by the step S308. Inasmuch as the base central processing unit 48 of the third base station 13 does not carry out judgment for all speech channels at this time instant (No in the step S308), the step S308 is succeeded by a step S309 at which the base central processing unit 48 of the third base station 13 decrements the parameter i by one to select an (i−1)-th speech channel having the channel number of #(i−1). The base central processing unit 48 of the third base station 13 turns back from the step S309 to the step S304. In the similar manner as described above, judgment of interference conditions is carried out by repeating the steps S304 to S306. Although the base central processing unit 48 of the third base station 11 carries out judgment for the first speech channel #1 which is the final speech channel, when the base central processing unit 48 of the third base station 13 cannot find a usable speech channel (Yes of the step S308), the step S308 is succeeded by a step S310 at which call loss occurs in the base central processing unit 48 of the third base station 11.

In this event, the transmission power control illustrated in FIG. 4 is carried out concurrently with the above-mentioned channel assignment. Inasmuch as this case especially defines separation of the speech channels used in the macrocell and the speech channels used in the microcell, it is possible to grasp the utilization frequency by measuring the transmission power in the order retrieved.

Figure 7:
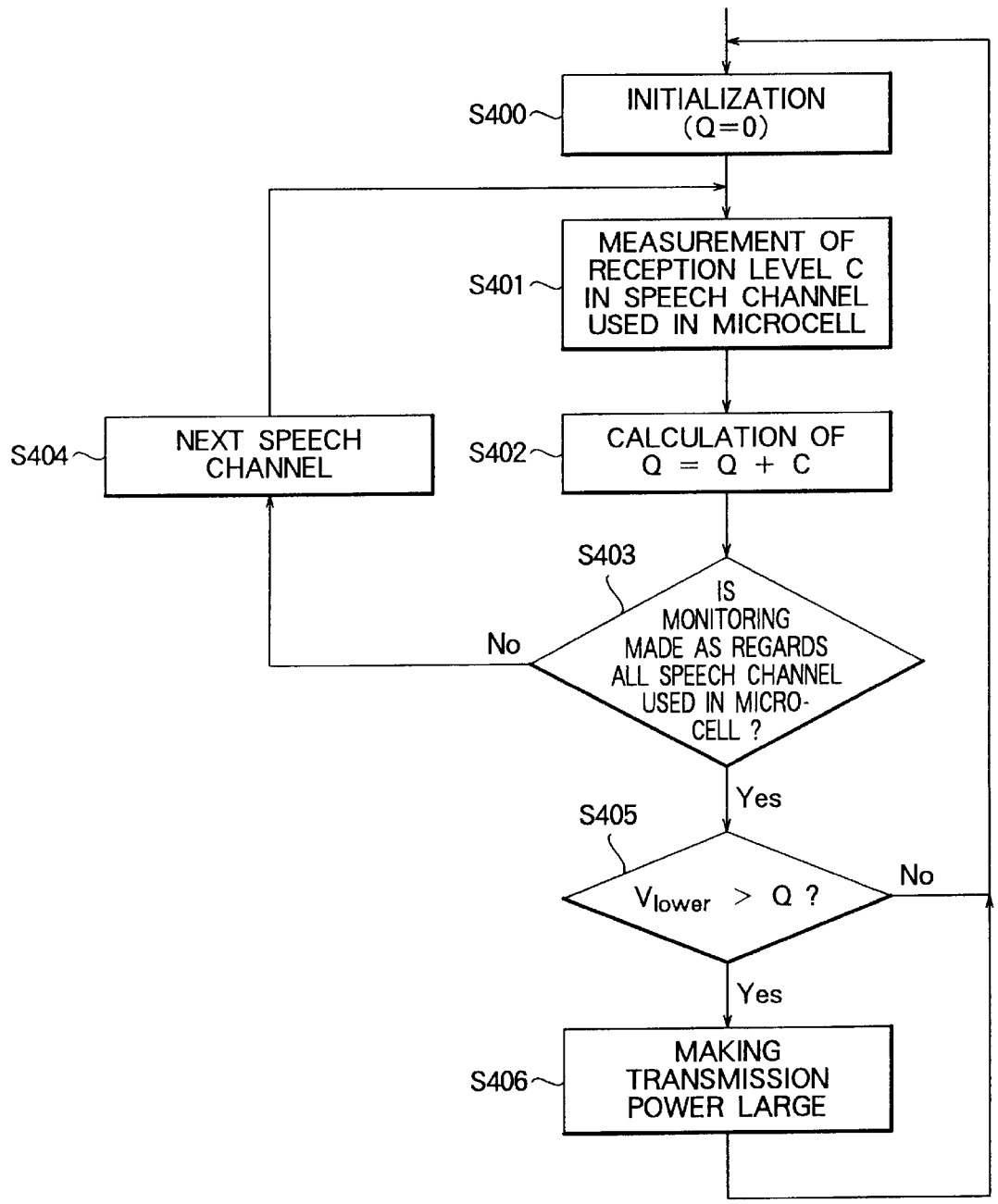
FIG. 7 shows a flow chart for use in describing another transmission power control in a base station belonging to a first group of the mobile communication system illustrated in FIG. 1.

Referring to FIG. 7 in addition to FIGS. 1 and 2, description will be made as regards another transmission power control in each of the first and the second base stations 11 and 12 covering the first and the second microcells 16 and 17.

After the base central processing unit 48 of the base station carries out initialization (Q=0) at a step S400, the base central processing unit 48 successively receives, from the base speech channel reception level detection circuits 45-1 to 45-N, measured results each of which indicates a reception level C of electric field in a speech channel which is used in the microcell as a step S401 and then the base central processing unit 48 accumulates the measured results at a step S402. The step S402 proceeds to a step S403 at which the base central processing unit 48 determines whether or not monitoring is made as regards all speech channels used in the microcell. When a determination in the step S403 is negative, the step S403 is followed by a step S404 at which the base central processing unit 48 makes the base channel selection circuit 46 select the next speech channel used in the microcell. The base central processing unit 48 turns back from the step S404 to the step S401. At any rate, the base central processing unit 48 at the steps S400 to S404 serves, in cooperation with the base speech channel reception level detection circuits 45-1 to 45-N and the base channel selection circuit 46, as a monitor arrangement for monitoring utilization conditions in the speech channels to produce a monitored result Q indicative of the utilization conditions. The monitor arrangement may monitor only the speech channels each having high priority in the first group.

When the monitoring is made as regards all speech channels used in the microcell (Yes in the step S403), the step S403 is succeeded by a step S405 at which the base central processing unit 48 determines whether or not the monitored result Q is smaller than a lower limit threshold value $V_{lower}$. The monitored result Q represents a sum of signal levels in all speech channels assigned to the microcell and corresponds to the number of speech channels which the base stations belonging to the first group use. If the monitored result Q is not less than the lower limit threshold value $V_{lower}$ (No in the step S405), namely, $$V_{lower} < Q,$$

the base central processing unit 48 turns back from the step S405 to the step S400 immediately.

If the monitor result Q is less than the lower limit threshold value $V_{lower}$ (Yes in the step S405), namely, $$V_{lower} > Q,$$

the step S405 is followed by a step S406 at which the base central processing unit 48 makes transmission power in the base station in question large and thereafter the base central processing unit 48 turns back from the step S406 to the step S400. Accordingly, the third base station 13 covering the macrocell 18 recognizes more speech channels used in the first and the second microcells 16 and 17. As a result, the third base station 13 belonging to the second group does not use the last-mentioned speech channels and it is possible to decrease mutual interference between the hierarchies. At any rate, the base central processing unit 48 at the steps S405 and S406 acts as a transmission power control arrangement for controlling the transmission power on the basis of the monitored result. The illustrated transmission power control arrangement makes the transmission power large when the monitored result Q indicates that the base stations 11 and 12 belonging to the first group use few speech channels which are in number less than a second predetermined number.

Figure 8:
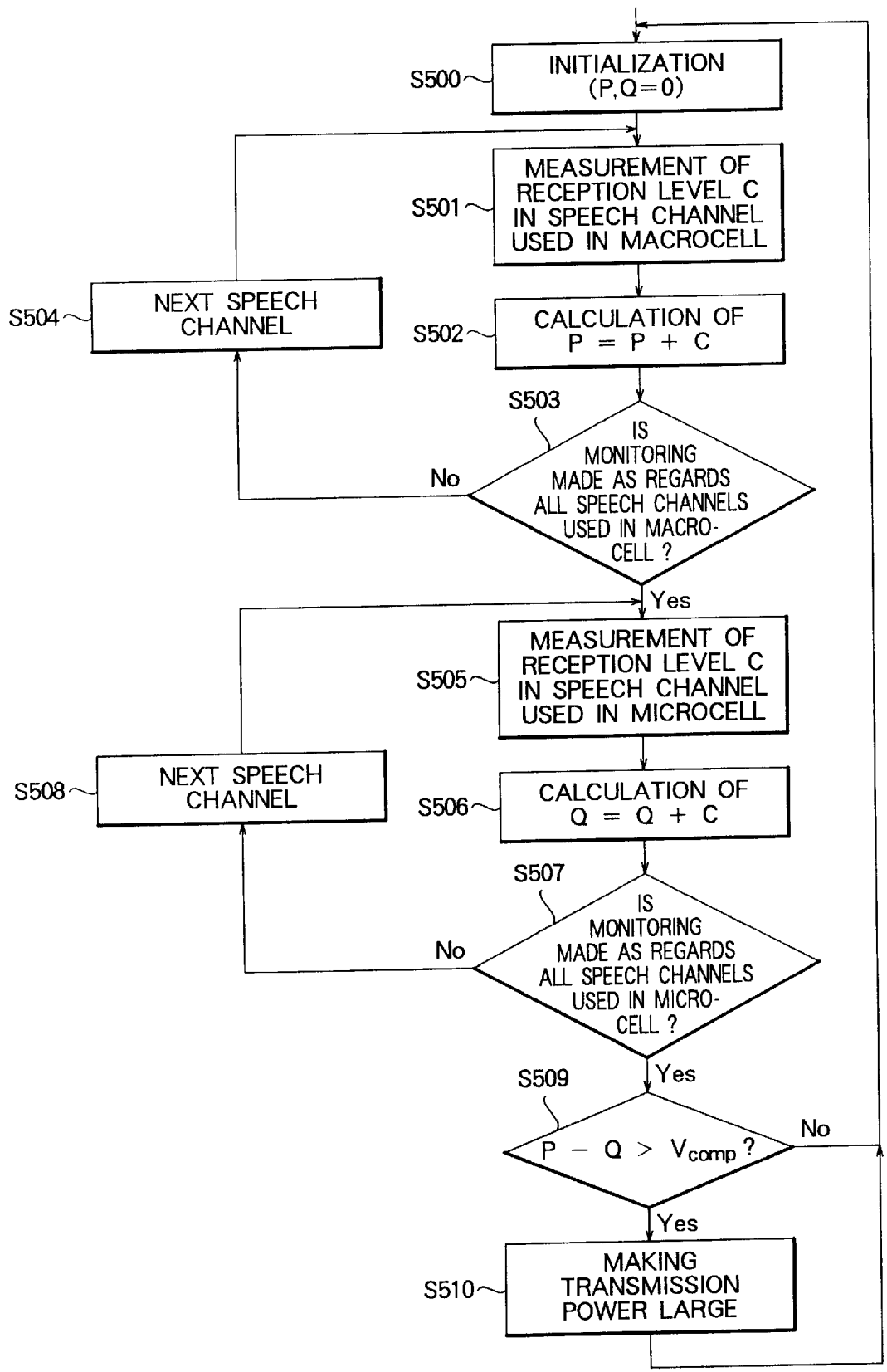
FIG. 8 shows a flow chart for use in describing still another transmission power control method in a base station belonging to a first group of the mobile communication system illustrated in FIG. 1.

Referring to FIG. 8 in addition to FIGS. 1 and 2, description will be made as regards still another transmission power control in each of the first and the second base stations 11 and 12 covering the first and the second microcells 16 and 17. The illustrated transmission power control uses a utilization factor of the speech channels.

After the base central processing unit 48 of the base station carries out initialization (P, Q=0) at a step S500, the base central processing unit 48 successively receives, from the base speech channel reception level detection circuits 45-1 to 45-N, primary measured results each of which indicates a reception level C of electric field in a speech channel which is used in the macrocell at a step S501 and then the base central processing unit 48 accumulates the primary measured results at a step S502. The step S502 proceeds to a step S503 at which the base central processing unit 48 determines whether or not primary monitoring is made as regards all speech channels used in the macrocell. When a determination in the step S503 is negative, the step S503 is followed by a step S504 at which the base central processing unit 48 makes the base channel selection circuit 46 select the next speech channel used in the macrocell. The base central processing unit 48 turns back from the step S504 to the step S501. The base central processing unit 48 at the steps S500 to S504 calculates, in cooperation with the base speech channel reception level detection circuits 45-1 to 45-N and the base channel selection circuit 46, a primary utilization frequency P of the macrocell.

When the primary monitoring is made as regards all speech channels used in the macrocell (Yes in the step S503), the step S503 is succeeded by a step S505 at which the base central processing unit 48 successively receives, from the base speech channel reception level detection circuits 45-1 to 45-N, subsidiary measured results each of which indicates a reception level C of electric field in a speech channel which is used in the microcell at a step S505 and then the base central processing unit 48 accumulates the subsidiary measured results at a step S506. The step S506 proceeds to a step S507 at which the base central processing unit 48 determines whether or not subsidiary monitoring is made as regards all speech channels used in the microcell. When a determination in the step S507 is negative, the step S507 is followed by a step S508 at which the base central processing unit 48 makes the base channel selection circuit 46 select the next speech channel used in the microcell. The base central processing unit 48 turns back from the step S508 to the step S505. The base central processing unit 48 at the steps S505 to S508 calculates, in cooperation with the base speech channel reception level detection circuits 45-1 to 45-N and the base channel selection circuit 46, a subsidiary utilization frequency Q of the microcell.

At any rate, the base central processing unit 48 at the steps S500 to S508 serves, in cooperation with the base speech channel reception level detection circuits 45-1 to 45-N and the base channel selection circuit 46, as a monitor arrangement for monitoring utilization conditions in each speech channel to produce, as a monitored result indicative of the utilization conditions, a combination of the primary utilization frequency P and the subsidiary utilization frequency Q. The illustrated monitor arrangement may monitor only the speech channels each having high priority in each group.

When the subsidiary monitoring is made as regards all speech channels used in the microcell (Yes in the step S507), the step S507 is succeeded by a step S509 at which the base central processing unit 48 compares a threshold value $V_{comp}$ with a difference (P–Q) between the primary utilization frequency P and the subsidiary utilization frequency Q. If the difference (P–Q) is not more than the threshold value $V_{comp}$ (No in the step S509), namely, $$V_{comp} > (P-Q),$$

the base central processing unit 48 turns back from the step S509 to the step S500 immediately.

If the difference (P–Q) is more than the threshold value $V_{comp}$ (Yes in the step S509), namely, $$V_{comp} < (P-Q),$$

the base central processing unit 48 judges that the microcell is easy to suffer interference from the macrocell and the base central processing unit 48 therefore makes transmission power in the base station in question large at a step S510. Thereafter the base central processing unit 48 turns back from the step S510 to the step S500. Accordingly, the third base station 13 covering the macrocell 18 recognizes more speech channels used in the first and the second microcells 16 and 17. As a result, the third base station 13 belonging to the second group does not use the last-mentioned speech channels and it is possible to decrease mutual interference between the hierarchies. At any rate, the base central processing unit 48 at the steps S509 and S510 acts as a transmission power control arrangement for controlling the transmission power on the basis of the monitored result. Specifically, the illustrated transmission power control arrangement makes the transmission power large when the monitored result indicates a value (P–Q) obtained by subtracting a first (or the subsidiary) utilization frequency Q from a second (or the primary) utilization frequency P exceeds a predetermined threshold value $V_{comp}$.

In the above-mentioned transmission power control, measurement of interference power may be made as regards the speech channels having high priority retrieved alone. In this event, it is possible to achieve efficiency of observation.

While this invention has thus far been described in conjunction with a few preferred embodiments thereof, it will readily be possible for those skilled in the art to put this invention into practice in various other manners.

What is claimed is:

1. In a mobile communication system comprising a plurality of base stations each covering a cell, said base stations being classified into first and second groups, each of the base stations belonging to the first group covering a microcell which is a relatively narrower service area, each of the base stations belonging to the second group covering a macrocell which is a relatively wider service area so as to cover a plurality of microcells, each base station selecting, in response to a communication request, as a selected speech channel, one of a plurality of speech channels and assigning the selected speech channel when the selected communication channel has a power ratio of a desired wave to an interference wave that is not less than a predetermined level, wherein each of said base stations belonging to the first group comprising:

monitor means for monitoring utilization conditions in the speech channels to produce a monitored result indicative of the utilization conditions; and transmission power control means for controlling transmission power on the basis of the monitored result.

2. A mobile communication system as claimed in claim 1, wherein said monitor means monitors only the speech channels each having high priority in each group.

3. A mobile communication system as claimed in claim 1, wherein said transmission power control means makes the transmission power large when the monitored result indicates that the base stations belonging to the second group use a lot of speech channels which are in number more than a first predetermined number.

4. A mobile communication system as claimed in claim 3, wherein said monitor means monitors only the speech channels each having high priority in the second group.

5. A mobile communication system as claimed in claim 1, wherein said transmission power control means makes the transmission power large when the monitored result indicates that the base stations belonging to the first group use few speech channels which are in number less than a second predetermined number.

6. A mobile communication system as claimed in claim 5, wherein said monitor means monitors only the speech channels each having high priority in the first group.

7. A mobile communication system as claimed in claim 1, the base stations belonging to the first group using the speech channels at a first utilization frequency, the base stations belonging to the second group using the speech channels at a second utilization frequency, wherein said transmission power control means makes the transmission power large when the monitored result indicates that a value obtained by subtracting the first utilization frequency from the second utilization frequency exceeds a predetermined threshold value.

8. A mobile communication system as claimed in claim 7, wherein said monitor means monitors only the speech channels each having high priority in each group.

9. In a mobile communication system comprising a plurality of base stations each covering a cell, said base stations being classified into first and second groups, each of the base stations belonging to the first group covering a microcell which is a narrow service area, each of the base stations belonging to the second group covering a macrocell which is a wide service area so as to cover a plurality of microcells, the base stations belonging to the first group being assigned with channel selection order of a plurality of speech channels that is different from that of the base stations belonging to the second group, each base station selecting, in response to a communication request, as a selected speech channel, one of the speech channels in accordance with the channel selection order and assigning the selected speech channel when the selected speech channel has a power ratio of a desired wave to an interference wave that is not less than a predetermined level, wherein each of said base stations belonging to the first group comprising:

monitor means for monitoring utilization conditions in the speech channels to produce a monitored result indicative of the utilization conditions; and transmission power control means for controlling transmission power on the basis of the monitored result.

10. A mobile communication system as claimed in claim 9, wherein said monitor means monitors only the speech channels each having high priority in each group.

11. A mobile communication system as claimed in claim 9, wherein said transmission power control means makes the transmission power large when the monitored result indicates that the base stations belonging to the second group use a lot of speech channels which are in number more than a first predetermined number.

12. A mobile communication system as claimed in claim 11, wherein said monitor means monitors only the speech channels each having high priority in the second group.

13. A mobile communication system as claimed in claim 9, wherein said transmission power control means makes the transmission power large when the monitored result indicates that the base stations belonging to the first group use few speech channels which are in number less than a second predetermined number.

14. A mobile communication system as claimed in claim 13, wherein said monitor means monitors only the speech channels each having high priority in the first group.

15. A mobile communication system as claimed in claim 9, the base stations belonging to the first group using the speech channels at a first utilization frequency, the base stations belonging to the second group using the speech channels at a second utilization frequency, wherein said transmission power control means makes the transmission power large when the monitored result indicates that a value obtained by subtracting the first utilization frequency from the second utilization frequency exceeds a predetermined threshold value.

16. A mobile communication system as claimed in claim 15, wherein said monitor means monitors only the speech channels each having high priority in each group.

17. A method of controlling transmission power in a mobile communication system comprising a plurality of base stations each covering a cell, said base stations being classified into first and second groups, each of the base stations belonging to the first group covering a microcell which is a relatively narrower service area, each of the base stations belonging to the second group covering a macrocell which is a relatively wider service area so as to cover a plurality of microcells, each base station selecting, in response to a communication request, as a selected speech channel, one of a plurality of speech channels and assigning the selected speech channel when the selected communication channel has a power ratio of a desired wave to an interference wave that is not less than a predetermined level, wherein said method comprising:

a first step, each of said base stations belonging to the first group, of monitoring utilization conditions in the speech channels to produce a monitored result indicative of the utilization conditions; and a second step, each of said base stations belonging to the first group, of controlling the transmission power on the basis of the monitored result.

18. A method as claimed in claim 17, wherein said first step monitors only the speech channels each having high priority in each group.

19. A method as claimed in claim 17, wherein said second step makes the transmission power large when the monitored result indicates that the base stations belonging to the second group use a lot of speech channels which are in number more than a first predetermined number.

20. A method as claimed in claim 19, wherein said first step monitors only the speech channels each having high priority in the second group.

21. A method as claimed in claim 17, wherein said second step makes the transmission power large when the monitored result indicates that the base stations belonging to the first group use few speech channels which are in number less than a second predetermined number.

22. A method as claimed in claim 21, wherein said first step monitors only the speech channels each having high priority in the first group.

23. A method as claimed in claim 17, the base stations belonging to the first group using the speech channels at a first utilization frequency, the base stations belonging to the second group using the speech channels at a second utilization frequency, wherein said second step makes the transmission power large when the monitored result indicates that a value obtained by subtracting the first utilization frequency from the second utilization frequency exceeds a predetermined threshold value.

24. A mobile communication system as claimed in claim 23, wherein said first step monitors only the speech channels each having high priority in each group.

25. A method of controlling transmission power in a mobile communication system comprising a plurality of base stations each covering a cell, said base stations being classified into first and second groups, each of the base stations belonging to the first group covering a microcell which is a narrow service area, each of the base stations belonging to the second group covering a macrocell which is a wide service area so as to cover a plurality of microcells, the base stations belonging to the first group being assigned with channel selection order of a plurality of speech channels that is different from that of the base stations belonging to the second group, each base station selecting, in response to a communication request, as a selected speech channel, one of the speech channels in accordance with the channel selection order and assigning the selected speech channel when the selected speech channel has a power ratio of a desired wave to an interference wave that is not less than a predetermined level, wherein said method comprising:

a first step, each of said base stations belonging to the first group, of monitoring utilization conditions in the speech channels to produce a monitored result indicative of the utilization conditions; and a second step, each of said base stations belonging to the first group, of controlling the transmission power on the basis of the monitored result.

26. A method as claimed in claim 25, wherein said first step monitors only the speech channels each having high priority in each group.

27. A method as claimed in claim 25, wherein said second step makes the transmission power large when the monitored result indicates that the base stations belonging to the second group use a lot of speech channels which are in number more than a first predetermined number.

28. A method as claimed in claim 27, wherein said first step monitors only the speech channels each having high priority in the second group.

29. A method as claimed in claim 25, wherein said second step makes the transmission power large when the monitored result indicates that the base stations belonging to the first group use few speech channels which are in number less than a second predetermined number.

30. A method as claimed in claim 29, wherein said first step monitors only the speech channels each having high priority in the first group.

31. A method as claimed in claim 25, the base stations belonging to the first group using the speech channels at a first utilization frequency, the base stations belonging to the second group using the speech channels at a second utilization frequency, wherein said second step makes the transmission power large when the monitored result indicates that a value obtained by subtracting the first utilization frequency from the second utilization frequency exceeds a predetermined threshold value.

32. A method as claimed in claim 31, wherein said first step monitors only the speech channels each having high priority in each group.

* * * * *